United States Patent
Hartmann et al.

(10) Patent No.: US 9,869,773 B2
(45) Date of Patent: Jan. 16, 2018

(54) HYBRID-ORGANIC X-RAY DETECTOR WITH CONDUCTIVE CHANNELS

(71) Applicant: Siemens Aktiengesellschaft, Munich (DE)

(72) Inventors: David Hartmann, Erlangen (DE); Patric Buechele, Erlangen (DE); Sandro Francesco Tedde, Weisendorf (DE); Oliver Schmidt, Erlangen (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 0 days.

(21) Appl. No.: 15/104,663

(22) PCT Filed: Dec. 8, 2014

(86) PCT No.: PCT/EP2014/076913
§ 371 (c)(1),
(2) Date: Jun. 15, 2016

(87) PCT Pub. No.: WO2015/091067
PCT Pub. Date: Jun. 25, 2015

(65) Prior Publication Data
US 2016/0320494 A1 Nov. 3, 2016

(30) Foreign Application Priority Data
Dec. 18, 2013 (DE) .................. 10 2013 226 365

(51) Int. Cl.
*G01T 1/20* (2006.01)
*G01T 1/16* (2006.01)

(52) U.S. Cl.
CPC . *G01T 1/20* (2013.01); *G01T 1/16* (2013.01)

(58) Field of Classification Search
CPC .................................... G01T 1/16; G01T 1/20
See application file for complete search history.

(56) References Cited

U.S. PATENT DOCUMENTS

| 6,483,099 B1 | 11/2002 | Yu et al. ............ 250/214.1 |
| 7,196,333 B1 | 3/2007 | Gerstenmayer et al. .. 250/370.1 |

(Continued)

FOREIGN PATENT DOCUMENTS

| DE | 10137012 A1 | 2/2003 | ............ G21K 1/10 |
| DE | 102008029782 A1 | 3/2012 | ............ H01L 51/42 |

(Continued)

OTHER PUBLICATIONS

German Office Action, Application No. 102013226365.1, 8 pages, dated Aug. 22, 2014.

(Continued)

*Primary Examiner* — David Porta
*Assistant Examiner* — Faye Boosalis
(74) *Attorney, Agent, or Firm* — Slayden Grubert Beard PLLC

(57) ABSTRACT

A detector for high-energy radiation, e.g., for x-radiation and/or UV radiation, may include (a) a substrate having a first electrical contact, (b) optionally a first intermediate layer, (c) a layer including an organic matrix of a photoactive material and insoluble scintillator particles distributed substantially homogeneously in the organic matrix, (d) optionally a second intermediate layer, and (e) a second electrical contact, wherein the mixture ratio between the scintillator particles and the organic matrix in layer (c) is selected in such a way that the intermediate space filled with the organic matrix has a distance between two scintillator particles that corresponds to at most five times the depth of penetration of the emitted radiation of the scintillator particles. A method for producing a corresponding detector is also disclosed.

24 Claims, 6 Drawing Sheets

(56) References Cited

U.S. PATENT DOCUMENTS

| | | | |
|---|---|---|---|
| 8,637,831 B2 | 1/2014 | Hayden et al. | 250/370.11 |
| 2011/0095266 A1 | 4/2011 | Hayden et al. | 257/21 |
| 2013/0032720 A1 | 2/2013 | Lee et al. | 250/361 R |
| 2013/0032723 A1 | 2/2013 | Lee et al. | 250/369 |

FOREIGN PATENT DOCUMENTS

| | | | | |
|---|---|---|---|---|
| DE | 102010043749 A1 | 5/2012 | | G01T 1/20 |
| DE | 102011083692 A1 | 4/2013 | | A61N 5/10 |
| EP | 2453263 A2 | 5/2012 | | G01T 1/02 |
| WO | 2015/091067 A1 | 6/2015 | | G01T 1/16 |

OTHER PUBLICATIONS

International Search Report and Written Opinion, Application No. PCT/EP2014/076913, 17 pages, dated Mar. 19, 2015.

FIG 4
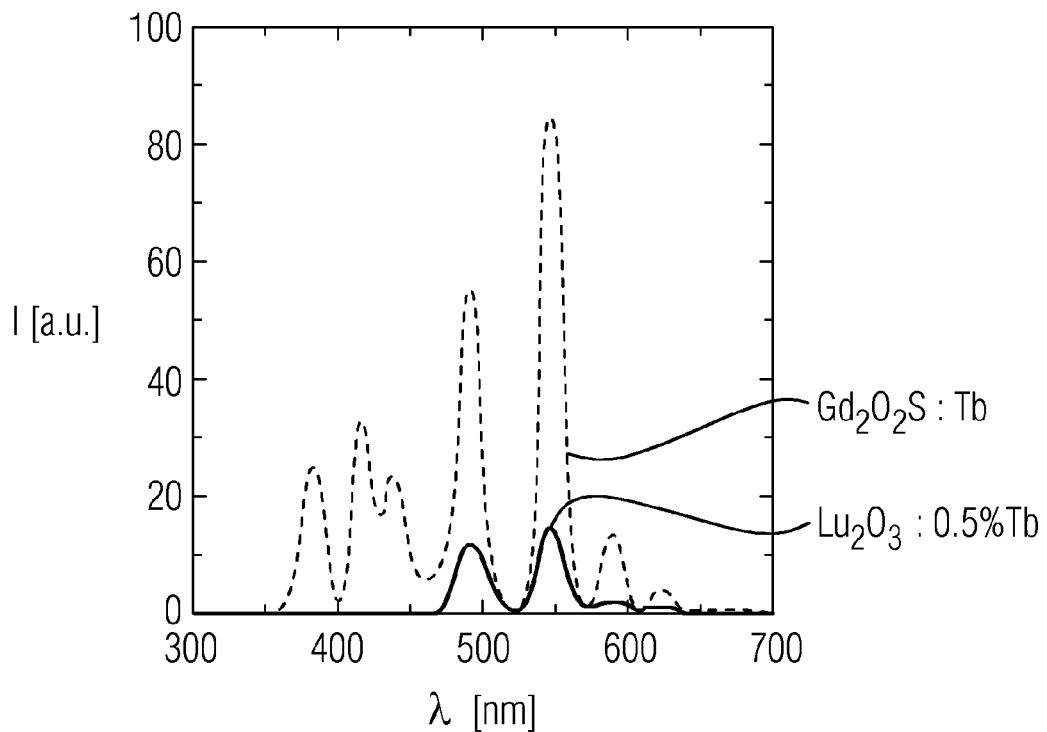
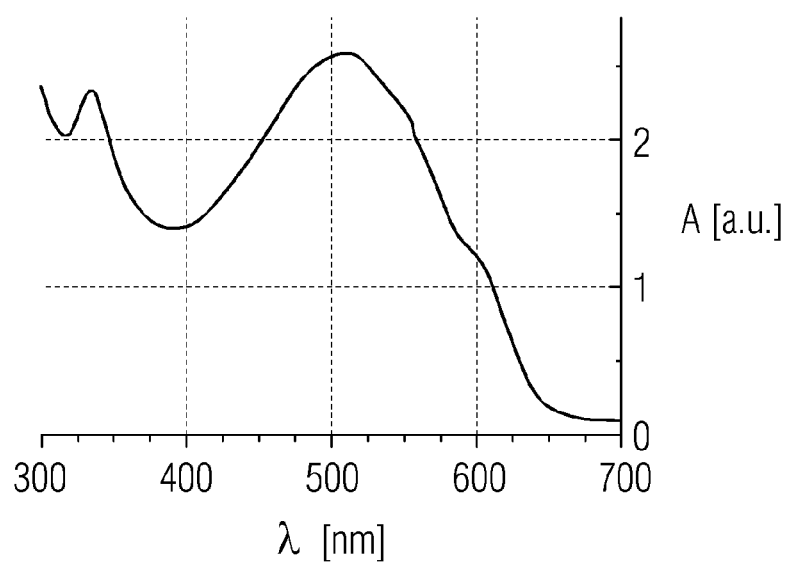

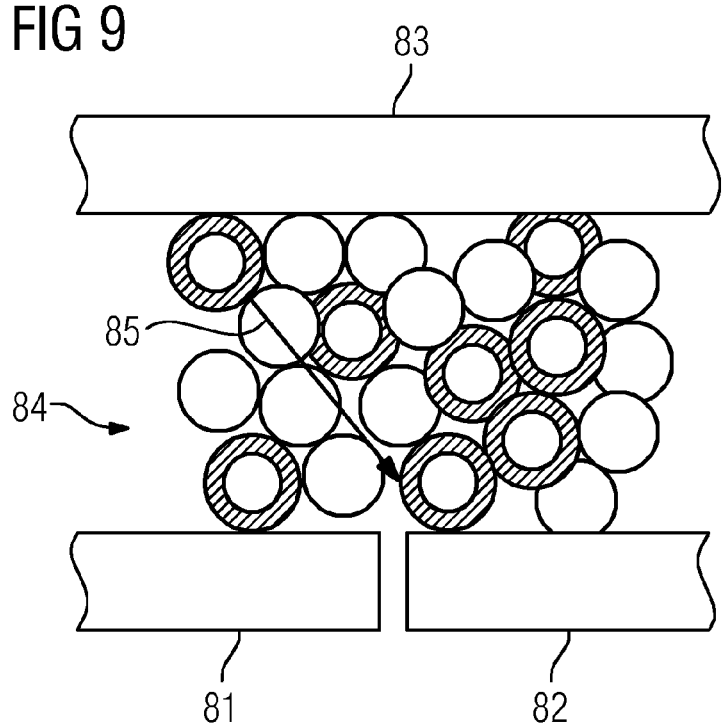

HYBRID-ORGANIC X-RAY DETECTOR WITH CONDUCTIVE CHANNELS

CROSS-REFERENCE TO RELATED APPLICATIONS

This application is a U.S. National Stage Application of International Application No. PCT/EP2014/076913 filed Dec. 8, 2014, which designates the United States of America, and claims priority to DE Application No. 10 2013 226 365.1 filed Dec. 18, 2013, the contents of which are hereby incorporated by reference in their entirety.

TECHNICAL FIELD

The present invention relates to a detector for high-energy radiation, in particular for X-ray, gamma and/or UV radiation, including (a) a substrate with a first electrical contact, (b) optionally a first intermediate layer, (c) a layer that includes an organic matrix made of a photoactive material and non-soluble scintillator particles essentially distributed homogeneously therein, (d) optionally a second intermediate layer, and (e) a second electrical contact, wherein the mixing ratio between the scintillator particles and the organic matrix is selected in the layer (c) such that the space filled with the organic matrix has in each case a distance between two scintillator particles that corresponds to at most five times the depth of penetration of the radiation emitted by the scintillator particles, and also relates to a method for producing a corresponding detector.

BACKGROUND

The invention addresses a novel production method for digital X-ray detectors, such as are used inter alia in medical diagnostics. Detectors based on amorphous silicon (for indirect conversion) and amorphous selenium (for direct conversion) represent the current state of the art. The principles of direct conversion (left) and indirect conversion (right) are illustrated in FIG. 1. With direct conversion I, an X-ray quantum 1 excites a particle 2, electron/hole pairs 2a, 2b being generated, which pairs then migrate to the electrodes 4 (anode or cathode, pixel electrodes, for example), where they are detected. With indirect conversion II, the X-ray quantum 1 excites the particle 2, which again emits radiation 2' with lower energy (for example, visible light, UV or IR-radiation), which is then detected by means of a photodetector 3 (e.g. a photodiode).

Indirect X-ray conversion therefore contains, for example, the combination of a scintillator layer (for example, $Gd_2O_2S$ or CsI with different doping agents such as terbium, thallium, europium, etc.; layer thicknesses typically 0.1-1 mm) and a photodetector (preferably a photodiode). The emission wavelength of the scintillator light resulting from X-ray conversion overlaps in this case with the spectral sensitivity of the photodetector.

In the case of direct X-ray conversion, the X-rays are once again, for example, directly converted into electron/hole pairs and these are read out electronically (amorphous Se, for example). Direct X-ray conversion in selenium is usually carried out with layers that are up to 1 mm thick, which in the kV range are blocked in the reverse-biased direction. Whilst indirectly-converting detectors in particular have prevailed due to their being simple and economical to produce, direct converters have a clearly improved resolution capacity.

The production of detectors usually includes the insertion of the inorganic absorber materials, such as quantum dots or typical scintillator materials, into an organic matrix. Organic semiconductors can easily be applied from the liquid phase to large surfaces and through the direct inclusion of the inorganic scintillator particles, optical cross-talk can be clearly minimized.

Unlike inorganic semiconductors, organic semiconductors have a lower conductivity. This limited conductivity becomes problematic when, as is the case with X-ray absorption, for example, very thick layers are required to achieve an adequate sensitivity. First, this reduces the efficiency of the photodiode since charge-carrier extraction is impeded. Second, the speed of the photodiode decreases, which very much restricts any use for medical technology devices. In addition, the added X-ray absorbing particles, which are not conductive, have a negative effect on the charge-carrying channel and extend it.

Organic semiconductors are predominantly applied from the liquid phase or by vapor deposition in a vacuum. All the methods known hitherto for the admixture of inorganic absorber materials involve processing from the liquid phase:

U.S. Pat. No. 6,483,099 B1 discloses the option for X-ray detection with a scintillator layer on an OPD (organic photodiode). Further designs are X-ray detection by the admixture of scintillators into an OPD, using a scintillator as a substrate or as part of the electrode. No information is given as to how a scintillator can be incorporated homogeneously into a thick OPD layer or how a hybrid diode that is 100 μm thick, for example, can be manufactured.

DE 101 37 012 A1 discloses a design for a light-sensitive and polymeric absorber layer with embedded scintillator particles. The conductivity of the polymer layer increases as a result of absorption of light from the scintillator. The average distance between the scintillator particles in the layer corresponds to the mean free path of the photons from the scintillator in the polymer.

DE 10 2008 029 782 A1 describes an X-ray detector based on quantum dots which are admixed into the organic semiconductor matrix. In this concept, the quantum dots are dispersed into the organic semiconductor solution. Here ligands, such as oleic acid or suchlike are used, which may affect the electrical properties of the organic semiconductor.

DE 10 2010 043 749 A1 relates to an X-ray detector based on the above concept, wherein scintillators are either dispersed directly into the organic semiconductor solution or sprayed on in a "co-spray process" at the same time as the organic semiconductor material.

SUMMARY

One embodiment provides a detector for high-energy radiation, in particular for X-ray, gamma, and/or UV radiation, including: (a) a substrate with a first electrical contact; (b) optionally a first intermediate layer; (c) a layer that includes an organic matrix made of a photoactive material and non-soluble scintillator particles essentially distributed homogeneously therein, (d) optionally a second intermediate layer, and (e) a second electrical contact, wherein the mixing ratio between the scintillator particles and the organic matrix is selected in the layer (c) such that the space filled with the organic matrix has in each case a distance between two adjacent scintillator particles that corresponds at most to five times the depth of penetration of the radiation emitted by the scintillator particles.

In a further embodiment, the scintillator particles have a diameter of 0.01 to 50 μm.

In a further embodiment, the distance between two scintillator particles is between 30 and 3000 nm, e.g., between 100 to 900 nm.

In a further embodiment, the mixing ratio between the scintillator particles and the organic matrix is selected such that the cumulative thickness of the organic matrix between the two contacts corresponds to at least three times the depth of penetration.

In a further embodiment, the photoactive material is provided in the form of a donor/acceptor mixture.

In a further embodiment, the material of the organic matrix is highly resistive in the non-irradiated state of the detector and becomes conductive through irradiation of the detector.

In a further embodiment, the respective distance between two scintillator particles is less than three times the depth of penetration of the radiation emitted by the scintillator particles.

In a further embodiment, the material of the organic matrix absorbs radiation in a wavelength range in which the scintillator particles emit radiation.

In a further embodiment, the mass of the scintillator particles is at least 8 times greater than the mass of the organic matrix.

In a further embodiment, the first electrical contact and/or the second electrical contact include a material that reflects the radiation emitted by the scintillator particles or consist thereof.

Another embodiment provides a method for producing a detector for high-energy radiation, e.g., for X-ray, gamma and/or UV radiation, including: (i) providing a substrate with a first electrical contact; (ii) optionally coating with a first intermediate layer; (iii) coating with a layer that includes an organic matrix of a photoactive material and non-soluble scintillator particles distributed homogeneously therein; (iv) optionally coating with a second intermediate layer; and (v) coating with a second electrical contact; wherein during coating, the mixing ratio between the scintillator particles and the organic matrix is selected in step (iii) such that the space filled with the organic matrix has in each case a distance between two scintillator particles that essentially corresponds to at most five times the absorbed wavelength of the radiation emitted by the scintillator particles.

In a further embodiment, the scintillator particles have a diameter of 0.01 to 50 μm.

In a further embodiment, the mixing ratio between the scintillator particles and the organic matrix is selected such that the cumulative thickness of the organic matrix between the two contacts corresponds to at least three times the depth of penetration.

In a further embodiment, the mass of the scintillator particles is at least 8 times greater than the mass of the organic matrix.

In a further embodiment, in order to create the coating in step (iii), a suspension that includes scintillator particles, at least one organic semiconductor and at least one solvent is produced, which is then applied in step (iii) by knife-, spin- or spray-coating and optionally dried by evaporating off the remaining solvent.

In a further embodiment, the suspension is continuously mixed/stirred during processing.

In a further embodiment, in order to create the coating in step (iii), a powder consisting of scintillator particles encased in at least one organic semiconductor is applied by sintering, for example, in step (iii).

BRIEF DESCRIPTION OF THE DRAWINGS

Example aspects and embodiment of the invention are described in detail below with reference to the drawings, in which:

FIG. 4 shows by way of example the alignment of the emission of scintillator particles with the absorption of the organic matrix.

FIG. 9 shows in diagram form possible loss channels in a detector with a very high content of scintillator particles.

DETAILED DESCRIPTION

Figure 1:
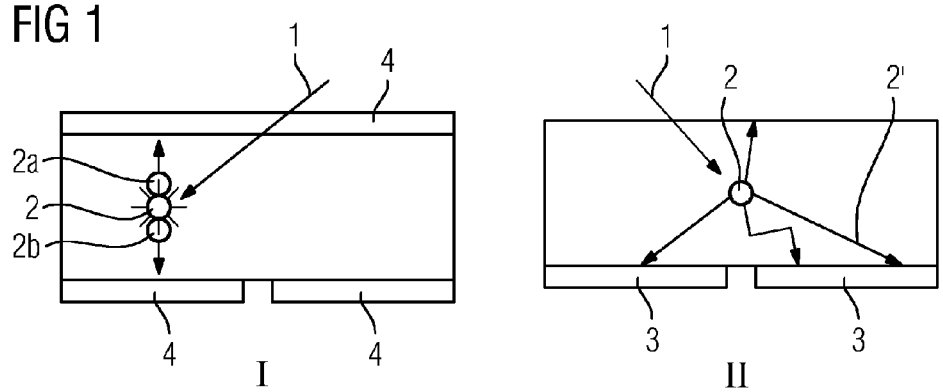
FIG. 1 compares in schematic form the concepts of direct X-ray conversion and indirect X-ray conversion.

Embodiments of the present invention relate to the production of X-ray detectors based on inorganic absorber materials, such as, for example, quantum dots or typical scintillator materials, which are admixed to an organic semiconductor matrix. This combination promises to combine the advantages of both the aforementioned concepts (indirect conversion and direct conversion). Organic semiconductors can easily be applied to large surfaces from the liquid phase, and by direct admixture of the inorganic scintillator particles, optical cross-talk can be clearly minimized.

Contrary to the obvious assumption that a compromise has to be found between a high scintillator content (=good X-ray absorption) and a high organic content (good conductivity) in such detectors, it was found according to the invention that high scintillator contents are advantageous in order to generate conductive channels during X-ray excitation.

Accordingly, advantageous or optimal mixing ratio of scintillator to organic materials is disclosed herein.

Some embodiments provide a detector for high-energy radiation, in particular for X-ray, gamma and/or UV radiation, including:
(a) a substrate with a first electrical contact;
(b) optionally a first intermediate layer;
(c) a layer that includes an organic matrix made of a photoactive material and non-soluble scintillator particles essentially distributed homogeneously therein;
(d) optionally a second intermediate layer; and
(e) a second electrical contact; wherein
the mixing ratio between the scintillator particles and the organic matrix is selected in the layer (c) such that the space filled with the organic matrix has in each case a distance between two adjacent scintillator particles that corresponds to at most five times the depth of penetration of the radiation emitted by the scintillator particles.

According to a further aspect, the present invention further relates to a method for the production of a detector for high-energy radiation, in particular for X-ray, gamma and/or UV radiation, including:

(i) providing a substrate with a first electrical contact;
(ii) optionally coating with a first intermediate layer;
(iii) coating with a layer that includes an organic matrix made of a photoactive material and non-soluble scintillator particles essentially distributed homogeneously therein;
(iv) optionally coating with a second intermediate layer; and
(v) coating with a second electrical contact;

Wherein when coating in step (iii), the mixing ratio between the scintillator particles and the organic matrix is selected such that the space filled with the organic matrix has in each case a distance between two adjacent scintillator particles that essentially corresponds to at most five times the absorbed wavelength of the radiation emitted by the scintillator particles.

Some embodiments provide a detector for high-energy radiation, in particular for X-ray, and/or UV radiation, including:

(a) a substrate with a first electrical contact;
(b) optionally a first intermediate layer;
(c) a layer that includes an organic matrix made of a photoactive material and non-soluble scintillator particles essentially distributed homogeneously therein;
(d) optionally a second intermediate layer; and
(e) a second electrical contact; wherein the mixing ratio between the scintillator particles and the organic matrix is selected in the layer (c) such that the space filled with the organic matrix has in each case a distance between two adjacent scintillator particles that corresponds to at most five times the depth of penetration of the radiation emitted by the scintillator particles.

The distance between two adjacent scintillator particles is essentially at most five times the depth of penetration if the distance between at least 70% of the adjacent scintillator particles is at most five times the depth of penetration, preferably at least 80%, and more preferably at least 90%. According to some embodiments, the scintillator particles, that is, 100% of the scintillator particles, are distributed such that they have a distance between two adjacent scintillator particles that corresponds to at most five times the depth of penetration of the radiation emitted from the scintillator particles.

The scintillator particles may be essentially distributed homogeneously. The scintillator particles are essentially distributed homogeneously if the distance of adjacent scintillator particles from one another is essentially the same, wherein the respective distance between 90% of all the scintillator particles from one another deviates on average by not more than 50 percent, preferably not more than 30%, more preferably not less than 10% from the average distance in the case of a homogeneous distribution of the scintillator particles.

According to one embodiment, the non-soluble scintillator particles in the layer that includes an organic matrix of a photoactive material are distributed homogeneously therein.

Here, the depth of penetration can be derived from the Beer-Lambert Law: $I = I\_0 * \exp(-\alpha * d)$
I=transmitted intensity
I_0=initiated intensity
alpha=absorption coefficient
d=layer thickness/depth of penetration of the medium.

The depth of penetration delta is defined as the layer thickness at which the intensity of the electromagnetic radiation has dropped to the 1/e-th part of the initial value, and is consequently the reciprocal value of the wavelength-dependent absorption coefficient.

delta=1/alpha

For example, with a P3HT:PCBM donor-acceptor mix/bulk-heterojunction, the absorption coefficient in green light (wavelength 550 nm) is about 7.7e+04 cm-1, which corresponds to a depth of penetration of delta=130 nm.

For a good functionality of the detector according to the invention, the entire space between two particles should be excited by means of emitted photons. This is guaranteed according to the invention if, for example, the intensity has dropped to not less than 10%. In the selected example, this would be the case at about 300 nm such that here, with two particles therefore, said particles can even be around 600 nm apart, which then corresponds to around five times the depth of penetration. With five times the depth of penetration, a good absorption of the light emitted by the scintillator particles is guaranteed.

According to certain embodiments, the respective distance between two scintillator particles is less than three times the depth of penetration of the radiation emitted by the scintillator particles.

According to some embodiments, the distance between two adjacent scintillator particles is at most three times the depth of penetration of the radiation emitted by the scintillator particles, and according to particular embodiments, the distance between two adjacent scintillator particles is at most double the depth of penetration of the radiation emitted by the scintillator particles. In such a case (double the depth of penetration) the charge transport in the matrix is improved effectively by the generation of conductive channels between two adjacent scintillator particles during X-ray excitation.

Furthermore, the distance between two scintillator particles in certain embodiments is between 30 and 3000 nm, e.g., between 100 and 900 nm. In addition, according to certain embodiments, the scintillator particles are arranged such that the conductive zones that are generated through the emission of the scintillator particles intersect and thus rapid response characteristics can be achieved.

According to certain embodiments, the scintillator particles have a diameter 0.01 to 50 μm. This can be determined and consequently adjusted according to optical (for example, dynamic light scatter, DLS), electron-microscopic, or electrical analysis (for example, with a Coulter Counter). As the diameter of the particles is reduced, the emission strength generally decreases. According to some embodiments, the scintillator particles have a diameter of 0.1-30 μm, e.g., 1-10 μm, which is aligned with the interaction length of high energy electrons that are released by X-ray quanta. For the detection of UV radiation, the reduction has a lesser impact, which is why even smaller particles with a diameter of up to 10 nm can be used here.

In further embodiments, the mixing ratio between the scintillator particles and the organic matrix is such that the cumulative thickness of the organic matrix between the two contacts corresponds to at least three times the depth of penetration. This ensures that none of the photons emitted by the scintillator particles leave the detector without being absorbed. For example, when using P3HT:PCBM as an organic matrix and a scintillator with an emission wave length in the green spectral range, this corresponds to a cumulative thickness of at least 0.4 µm, irrespective of the selected total thickness of the detection layer. In this way, it can be guaranteed that light is sufficiently absorbed in the matrix even when the scintillator particles are not essentially distributed homogeneously. Accordingly, in order to fulfill this condition, a lower mass content of the organic matrix is required for thicker detection layers than for thinner detection layers. Nevertheless, according to certain embodiments, the distance between two scintillator particles in the organic matrix for at least 90% of the scintillator particles, e.g., for all the scintillator particles is at least 10 nm in order to guarantee a sufficient cohesion of the matrix and the scintillator particles, and more preferably at least 20 nm or at least 30 nm.

According to certain embodiments, the organic matrix can contain more than one photoactive material and/or the detector more than one kind of scintillator particles.

According to certain embodiments, the photoactive material is provided in the form of a donor/acceptor mix. The donor/acceptor mix is also referred to in this case as a bulk-heterojunction.

A typical representative of a strong electron-donor (low electron affinity) is, for example, the conjugated polymer poly (3-hexylthiophene) (P3HT). Typical materials for electron acceptors (high electron affinity) are fullerenes and derivatives thereof, such as, for example [6.6]-phenyl-$C_{61}$ butanic acid methyl esters (PCBM). In addition, it is also possible to use materials such as polyphenylene-vinylene and derivatives thereof such as the cyano derivative CN-PPV, MEH-PPV (poly (2-(2-ethylhexyloxy)-5-methoxy-p-phenylene-vinylene)), CN-MEH-PPV, or phthalocyanine, and so on. Other exemplary compounds are mentioned below, in combination with appropriate scintillator particles.

According to certain embodiments, in the non-illuminated state of the detector, the material of the organic matrix is highly resistive and becomes conductive as a result of irradiation of the detector. This results in an additional signal enhancement during detection since the background noise can also be minimized.

Here, the conditions for highly resistive are as follows: in thin diodes, the resistance of the diode in the reverse direction is essentially a factor of the contact resistance. This ensures that low dark currents can be achieved. For the use of an organic photodetector in the field of medical X-ray imaging, a dark current of not more than 1e-05 mA/cm$^2$ is required. At a reverse voltage of −1 V, this corresponds to 1e8 ohms for a detector with an area of 1 cm$^2$. For thicker diodes, as they may be by way of example here, the sheet resistance begins to play an increasing role. The resistance of the diode then increases with increasing layer thickness and a specific resistance can be specified. For a layer that is 100 µm thick, a dark current of 1e-6 mA/cm$^2$, which corresponds to a resistivity of 1e-11 ohms×cm, is desirable. Accordingly, for some embodiments, highly resistive means that the specific resistivity of the layer corresponds to at least 1e-9 ohms×cm, and preferably 1e-11 ohms×cm.

According to certain embodiments, the material in the organic matrix absorbs radiation in a wavelength range in which the scintillator particles emit radiation. According to certain embodiments, the photoactive material in the organic matrix additionally has at least one absorption maximum in a wavelength that corresponds to an emission wavelength of the scintillator particle, e.g., to the emission wavelength of a maximum of the emission of the scintillator particle.

Examples of combinations of materials for a combination of scintillator particles with photoactive organic materials for various wavelengths are as follows:

Suitable green scintillators are for example $Gd_2O_2S:Pr,Ce$ (praseodymium- and cerium-doped gadolinium oxysulfide with an emission maximum at about 515 nm), $Gd_2O_2S:Tb$ (terbium-doped gadolinium oxysulfide with an emission maximum at about 545 nm), $Gd_2O_2S:Pr,Ce,F$ (praseodymium-, cerium- or fluorine-doped gadolinium oxysulfide, with an emission maximum at about 510 nm), YAG:Ce (cerium-doped yttrium-aluminum-garnet with an emission maximum at about 550 nm), CsI:Tl (thallium-doped cesium iodide with an emission maximum at about 525 nm), $CDI_2$:Eu (europium-doped cadmium iodide with an emission maximum at about 580 nm) or $Lu_2O_3$:Tb (terbium-doped lutetium oxide with an emission maximum at about 545 nm). They are characterized by an emission maximum ranging from 515-580 nm, and are thus well designed for the absorption maximum of poly(3-hexylthiophene-2,5-diyl) (P3HT) (as an example of a photoactive material in the organic matrix) at 550 nm. The scintillator $Bi_4Ge_3O_{12}$ or BGO (bismuth germanate with an emission maximum at about 480 nm) can be combined well with poly[2-methoxy-5-(2-ethylhexyloxy)-1,4-phenylene-vinylene] (MEH PPV) or poly [2-methoxy-5-(3',7'-dimethyloctyloxy)-1,4-phenylene-vinylene] (MDMO-PPV), which have good absorption in the range 460-520 nm.

Appropriate blue scintillators should also be mentioned. An attractive combination of materials that emit in blue light are $Lu_2SiO_5$:Ce or LSO (cesium-doped lutetium oxyorthosilicate with an emission maximum at around 420 nm), $Lu_{1.8}Y_{0.2}SiO_5$:Ce (cerium-doped lutetium oxyorthosilicate with an emission maximum at around 420 nm), $CdWO_4$ (cadmium tungstate with an emission maximum at about 475 nm), CsI:Na (sodium-doped cesium iodide with an emission maximum at about 420 nm), or NaI:Tl (thallium-doped sodium iodide with an emission maximum at about 415 nm), $Bi_4Ge_3O_{12}$ or BGO (bismuth germanate with an emission maximum at around 480 nm), $Gd_2SiO_5$ or GSO (cerium-doped gadolinium oxyorthsilicate with an emission maximum at around 440 nm), or CsBr:Eu (europium-doped caesium bromide with an emission maximum at around 445 nm), which can be combined well with typical wide-band gap semiconductors (semiconductors with a wide band gap), such as poly[(9,9-di-n-octylfluorenyl-2,7-diyl)-alt-(benzo[2,1,3]thiadiazol-4,8-diyl)] (F8BT) (absorption maximum at 460 nm) or other polyfluorene (PFO) polymers and co-polymers (absorption at 380-460 nm).

Red scintillators such as $Lu_2O_3$:Eu (europium-doped lutetium oxide with an emission maximum at around 610-625 nm), $Lu_2O_3$:Tb (terbium-doped lutetium oxide with an emission maximum at around 610-625 nm) or $Gd_2O_3$:Eu (europium-doped gadolinium oxysulfide with an emission maximum at around 610-625 nm), YGdO:(Eu,Pr) (europium- and/or praseodymium-doped yttrium gadolinium oxide with an emission maximum at around 610 nm), GdGaO:Cr,Ce (chromium- and/or cesium-doped gadolinium gallium oxide), or CuI (copper iodide with an emission maximum at around 720 nm) can be combined well with absorbers, such as those developed for OPV (organic photovoltaics), for example poly[2,1,3-benzothiadiazole-4,7-diyl[4,4-bis(2-ethylhexyl)-4H-cyclopenta[2,1-b:3, 4-b']dithiophene-2,6-diyl]] (PCPDTBT), squaraines (e.g. hydrazone end-capped symmetrical squaraines with glycolic functionalization or diazulene squaraine), polythieno[3,4-b]thiophene (PTT), poly(5,7-bis(4-decanyl-2-thienyl)-thieno(3,4-b)diathiazolthiophene-2,5) (PDDTT).

According to some embodiments, these pairs are among those that are particularly noteworthy: Gd2O2S:Tb or YAG:Ce in combination with P3HT:PCBM, Lu2SiO5:Ce in combination with F8BT or YGdO:Eu with PCPDTBT.

An example of tuning/alignment of scintillator emission (for example, GOS or $Lu_2O_3$:Tb, green) with polymer absorption (for example, P3HT) is shown in FIG. 4, where the alignment from the emission spectrum of the scintillator (left) and the absorption spectrum of the organic matrix (right) can be seen clearly.

In certain embodiments, the mass of the scintillator particles is at least 8 times greater than the mass of the organic matrix.

This can be demonstrated with reference to the following theoretical considerations.

Target shell thickness and required quantity calculations:

The total volume of an exemplary hybrid photodiode is composed of the scintillator nucleus $V_{scintillator}$ and the shell volume of the bulk-heterojunction $V_{BHJ}$ (organic matrix). In order to be able to weigh up the optimum ratio, the densities of the bulk-heterojunction $\rho_{BHJ}$ and of the scintillator $\rho_{Scintillator}$ are required in order to obtain the respective weight $W_{BHJ}$ and $W_{Scintillator}$.

Total volume ($V_{Total}$) of the hybrid photodiode is:

$$V_{Total} = V_{BHJ} + V_{Scintillator} = \frac{W_{BHJ}}{\rho_{BHJ}} + \frac{W_{Scintillator}}{\rho_{Scintillator}}$$

In order to explain the key values in the ratio of the volumes and of the amounts specified, this is expressed as a percentage of the volume and a percentage of the quantities compared to the total volume and total quantity. The two formulae below illustrate this.

Percentage of the volume of the BHJ ($V_{BHJ}\%$):

$$V_{BHJ}\% = 100 \cdot \frac{V_{BHJ}}{V_{Total}}$$

Percentage of the quantity of the BHJ ($W_{BHJ}\%$):

$$W_{BHJ}\% = 100 \cdot \frac{W_{BHJ}}{W_{Scintillator} + W_{BHJ}}$$

The target shell volume is obtained via the desired absorption of the bulk-heterojunction. Absorption can be adjusted via the layer thickness $r_{BHJ}$ of the shell volume and accordingly via the absorption length of the emitted light. The shell volume is made up of the total volume with the radii $r_{scintillator}$ and $r_{BHJ}$ minus the inner sphere, the scintillator. It can be calculated as follows.

Target shell volume ($V_{BHJ}$) and shell thickness ($r_{BHJ}$)

$$V_{BHJ} = \frac{4\pi}{3}((r_{Scintillator} + r_{BHJ})^3 - (r_{Scintillator})^3)$$

As an example, for a scintillator with the radius $r_{Scintillator}$=1.8 µm and a target jacket absorption layer thickness of $r_{BHJ}$=0.15 µm, there is an optimum fill factor $V_{BHJ}\%$: $V_{Scintillator}\%$ of 37%:63%. With typical thicknesses of $\rho_{BHJ}$=1.2 g/ml and $\rho_{scintillator}$=7.2 g/ml there is a weight ratio of $W_{BHJ}$:$W_{scintillator}$ of around 1:10.

It remains to be pointed out in particular that this mass ratio is dependent on the diameter of the scintillator and the density thereof. The larger the particle, the less organic content is required to fulfill the aforementioned conditions. The volume ratios are dependent on the diameter of the scintillators and the depth of penetration of light into the organic matter. From the density, the mass ratio can then be calculated according to the above formulae. For example, for a Gd2O2S particle that is 2 µm in size, with a depth of penetration of 130 nm, a mass ratio of around 1:14 is optimal, whilst for a particle that is 10 µm in size, the mass ratio increases to 1:75.

According to certain embodiments, the first electrical contact and/or the second electrical contact include or consist of a material that reflects the radiation emitted by the scintillator particles. Here, metals such as Au, Ag, Pt, Al or Cu may be mentioned, but a number of further materials are known, such that the materials of the electrical contacts are not further restricted, so that they reflect the radiation emitted by the scintillator particles. Through an appropriate design, the signal detected by the detector can be further improved. Through the reflecting effect of the contacts on radiation emitted it can be ensured that emitted light does not escape from the active zone.

In certain embodiments, the detector according to the invention can optionally contain intermediate layers/interlayers that improve the transition between the active layer and the contact layers and consequently the contacts of the sample and which can contain, for example, coated scintillator particles.

Other embodiments provide a method for the production of a detector for high-energy radiation, in particular for X-ray and/or UV radiation, including:

(i) providing a substrate with a first electrical contact;
(ii) optionally coating with a first intermediate layer;
(iii) coating with a layer that includes an organic matrix of a photoactive material and non-soluble scintillator particles distributed homogeneously therein;
(iv) optionally coating with a second intermediate layer; and
(v) coating with a second electrical contact;

wherein when coating, the mixing ratio between the scintillator particles and the organic matrix is selected in step (iii) such that the space filled with the organic matrix has in each case a distance between two adjacent scintillator particles that essentially corresponds to at most five times the absorbed wavelength of the radiation emitted by the scintillator particles.

According to certain embodiments, the scintillator particles have a diameter of from 0.01 to 50 µm. According to some embodiments, the scintillator particles have a diameter of from 0.01 to 30 µm, e.g., of 1-10 µm, which is aligned with the interaction length of high-energy electrons that are released by X-ray quanta. According to further specific embodiments, the mixing ratio between the scintillator particles and the organic matrix is such that the cumulative thickness of the organic matrix between the two contacts is at least three times the depth of penetration. In addition, the mass of the scintillator particles according to certain embodiments of the method according to the invention is at least eight times greater than the mass of the organic matrix.

In certain embodiments of the method according to the invention, in order to create the coating in step (iii), a suspension of the scintillator particles is produced in the in organic matrix and at least one solvent, which suspension is then applied in step (iii) by blade-, spin- or spray-coating and optionally dried by evaporating off the remaining solvent. In some embodiments, the suspension is continuously mixed/stirred during processing. This can also ensue, for example, by agitation in a spray head. In addition, ultrasound can also be used as an additional aid.

According to certain embodiments of the method according to the invention, in order to create the coating in step (iii), a suspension that includes scintillator particles, at least one organic semiconductor and at least one solvent is produced, which suspension is then applied in step (iii) by blade-, spin- or spray-coating and optionally dried by evaporating off the remaining solvent.

According to certain embodiments, the suspension is continuously mixed/stirred during processing.

According to certain further embodiments, in order to create the coating in step (iii), a powder consisting of scintillator particles coated by at least one organic semiconductor (as a photoactive organic material)—is applied by sintering, for example, in step (iii).

In an alternative embodiment, the suspension can be converted into a powder by precipitation and subsequent removal of the solvent, said powder then being applied by sintering, for example, to a substrate.

The above embodiments, variants, and further developments can be used in combination with one another as desired insofar as this is expedient. Further possible variants, further developments and implementations of the invention also include combinations of features of the invention described with reference to the embodiments and not explicitly mentioned in the aforementioned or hereinafter. In particular, a person skilled in the art will also add individual aspects as improvements or additions to the respective basic form of the present invention.

Examples

Aspects of the invention are illustrated hereinafter by means of some example embodiments but is not restricted thereto, however.

Figure 2:
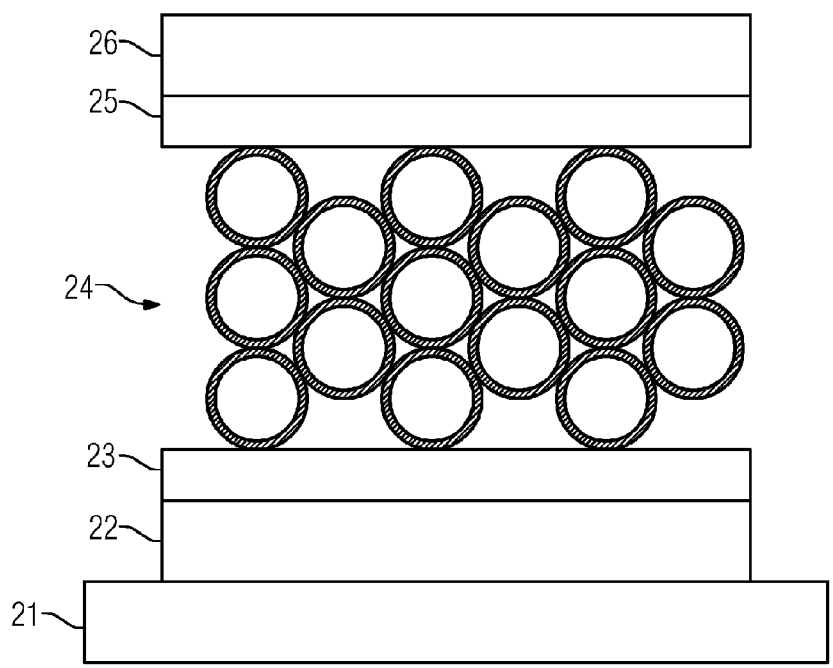
FIG. 2 shows in schematic form an example of an arrangement of a stack for a detector according to one embodiment.
Figure 3:
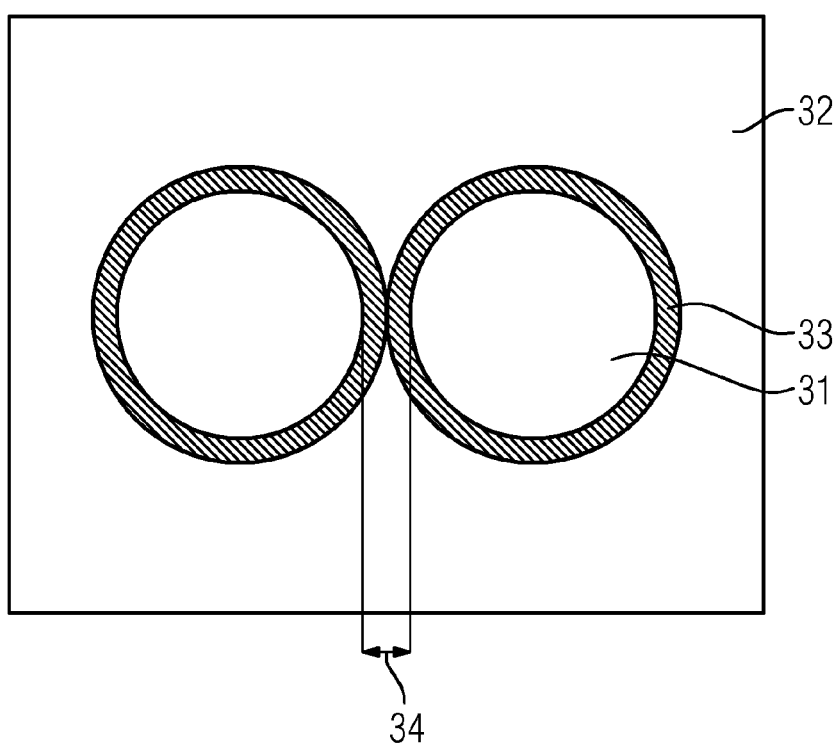
FIG. 3 shows in schematic form an example of a distance that two scintillator particles have between them according to one embodiment.

An example of an X-ray detector is shown in FIG. 2, and consists of:
- A substrate 21, which can be rigid or flexible (for example, glass or film) and comprises, for example, a TFT-matrix of amorphous silicon, organic materials or an oxide (InGaZnO, for example)
- A lower contact layer 22, e.g., of a material with a high work function, such as ITO, Au, Pt, Pd; with thick layers it is also possible to use the same materials for the electrodes in the upper and lower contact because, due to the organic content, the dark resistance is already so high that the user virtually has a photoconductor and does not require an additional barrier from the contacts.
- An active layer 24 consisting of a photosensitive conductive organic matrix (for example, a bulk-heterojunction made of P3HT and PCBM) and an X-ray-absorbing and light-emitting scintillator (GOS, for example)
- And an upper contact layer 26 with a low work function, for example, Al, Ca/Ag, Ba/Al, Ca/Al
- Wherein the mixing ratio between the matrix and the scintillator is set such that optimum charge-carrier generation and extraction is provided.
- This is achieved by selecting the mixing ratio such that the space filled with matrix material between two particles is at most twice the depth of penetration of the light emitted by the scintillator, as shown in FIG. 3.
- Optionally, intermediate layers/interlayers 23 and/or 25 can be provided, which improve the contact between the active layer and the contact layers, and which may include coated scintillator particles, for example.

An optimal mixing ratio between the organic matrix and the scintillator particles, which appears when the distance between the scintillator particles corresponds to twice the depth of penetration of the emission from the scintillator, is shown in FIG. 3, where 31 represents the light-emitting scintillator particle, 32 the organic (semiconductor) matrix, 33 the depth of penetration of the light emitted into the organic semiconductor, and 34 the scintillator spacing.

Contrary to the obvious assumption that a compromise has to be found between a high scintillator content (=good X-ray absorption) and a high organic content (good conductivity), it was found that high scintillator contents are advantageous in order to generate conductive channels during X-ray excitation.

A typical component, electrical characterization and X-ray sensitivity:

An example of an x-ray detector (photodiode) according to the invention is based on the principle shown in FIG. 3. In the active organic layer a combination of scintillator particles of $Gd_2O_2S$:Tb embedded in a photo- and electroactive BHJ shell consisting of P3HT and PCBM, is used. The BHJ layer is limited by an ITO anode and an Al cathode treated by means of thermal vapor deposition. The thickness of the Al cathode is approximately 250-500 nm, while the thickness of the ITO anode is approximately 80-200 nm. The active diode area is 1-100 $mm^2$.

Figure 5:
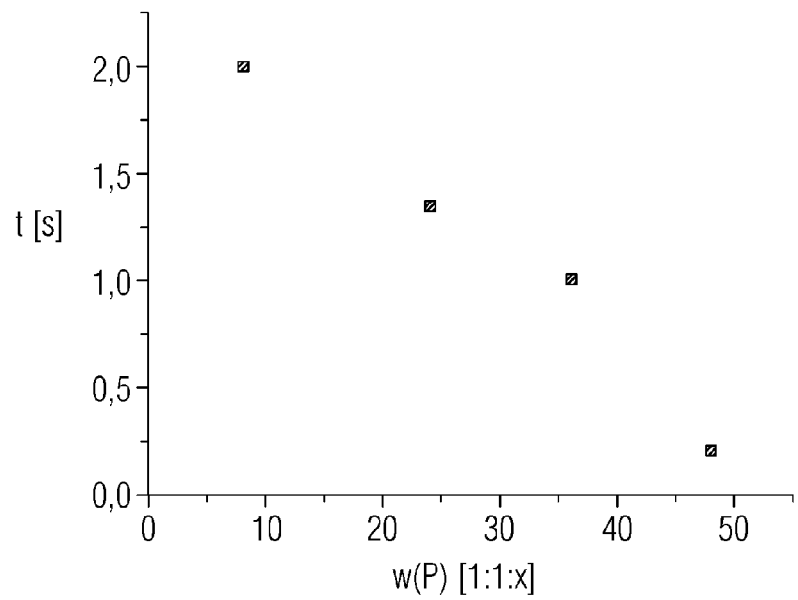
FIG. 5 shows the dependence of the rise-time of a photodiode in a detector according to the invention as a function of the content of scintillator particles.
Figure 7:
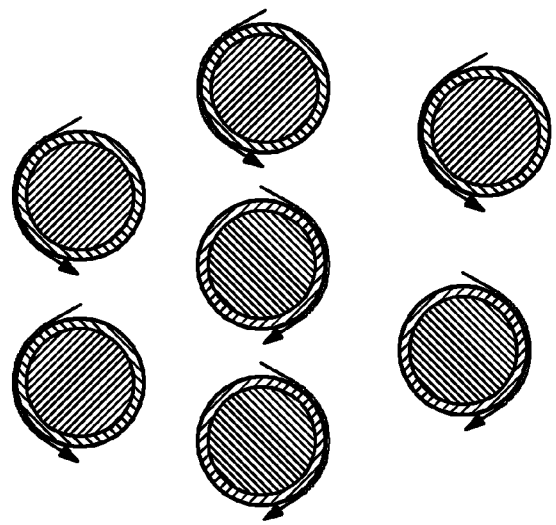
FIG. 7 shows in diagram form the functional principle of a detector with a low content of scintillator particles.
Figure 8:
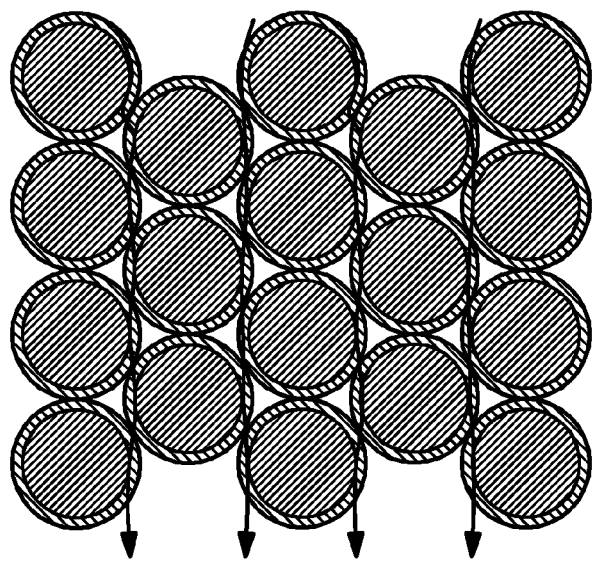
FIG. 8 shows in diagram form the functional principle of a detector with a high content of scintillator particles.

FIG. 5 shows the rise-time of such an exemplary photodiode to an X-ray pulse as a function of the scintillator content in the sample. The layer thickness "d" in all the samples is around 8 μm at an applied voltage "V" of approximately −8 V, which corresponds to an electrical field of around −1 V/μm. In the selected example, Gd2O3S particles with an average diameter of D=1.8 μm were used as scintillators and a mixture of P3HT and PCBM (weight ratio 1:1) was used as an organic matrix. The rise-time t decreases as the GOS content x increases and consequently the speed of the diode increases. With homogeneous X-ray excitation through the diode, a highly conductive coating appears round the scintillator particles, due to the emission of green light. If the GOS content in the diode is high enough for these coatings to overlap, a conductive channel is created from the lower to upper electrode and this vastly increases the rather poor conductivity of organic semiconductors, which results in a high speed and short rise-times. FIGS. 7 and 8 show in diagram form the functional principle with a low (FIG. 7) and a high (FIG. 8) GOS content. In FIG. 7 the conductive channels are not connected. Charge-carriers have to go through highly resistive spaces, which results in slow detector characteristics. In FIG. 8 the conductive shells touch and conductive channels are formed.

Figure 6:
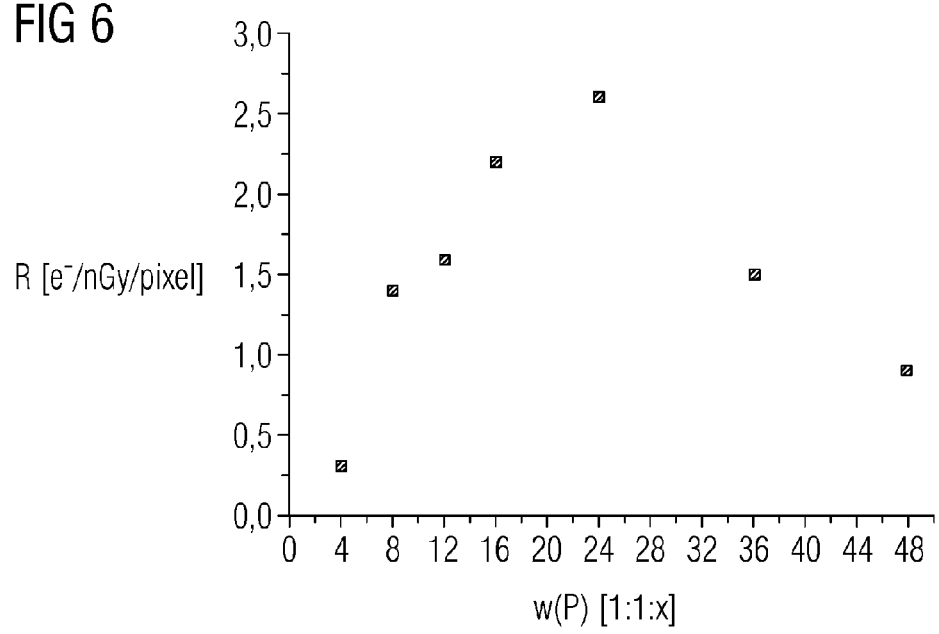
FIG. 6 shows the conversion rate of X-ray quanta to detected electrons in a detector according to the invention as a function of the content of scintillator particles x.

FIG. 6 shows the conversion rate of X-ray quanta into detected electrons with a varying scintillator content "x" in detectors according to the invention that are produced as above. The layer thickness "d" of all the samples is again 8 μm at an applied voltage "V" of around −8V, which corresponds to an electrical field of around −1V/μm. The GOS particles have an average diameter of D=1.8 μm. With this layer thickness and particle size, maximum sensitivity is achieved at around 1:1:24, since here the ratio for the depth of penetration of the scintillated green light to the total organic layer thickness (green absorber) is well adjusted in a vertical orientation of the photoactive layer. With greater layer thicknesses, this maximum moves into the direction of a higher GOS content (required total organic layer thickness at around 300-500 nm).

In practice, the following considerations may additionally be relevant to the minimum polymer content:

a) the polymer acts as a "glue" for the cohesion of the particles b) a sufficiently high absorption within a radius of around 20-50 µm should be provided in order to minimize optical cross-talk and to prevent the photons that have been generated escaping from the active layer of the detector, and c) it is not intended that a high number of "dead ends" form in the structure preventing charge transport, or resulting in a high rate of recombination of the charge carriers.

Possible loss channels, which may occur where the content of scintillator particles is too high, are shown in FIG. 9, in which the organic matrix is inserted with the scintillator particles between two lower contacts 81, 82, in a detector matrix for example, and an upper contact 83. With an excessively high proportion of scintillator particles, there is the possibility of non-confined current channels 84, which prevent an efficient charge carrier extraction, as well as the possibility of too low absorption 85, which may result in optical cross-talk or cause photons to leave the detector. In addition, too high a scintillator content can adversely affect the stability of the detector.

With the design according to the invention, it is possible (X-ray) to achieve detectors that respond much faster and have fewer line losses. At the same time, a high (X-ray) absorption can be ensured. Finally, the proposed system offers cost advantages, since the proportion of the expensive component (organics) is minimized.

What is claimed is:

1. A detector for high-energy radiation, including:
    a substrate with a first electrical contact;
    an active layer including an organic matrix made of a photoactive material and non-soluble scintillator particles essentially distributed homogeneously therein, and
    a second electrical contact,
    wherein the scintillator particles are spaced apart from each other by areas of the organic matrix, and
    wherein a mixing ratio between the scintillator particles and the organic matrix in the active layer is selected such that:
        (a) adjacent pairs of scintillator particles are spaced apart from each other by a maximum distance of five times a depth of penetration of radiation emitted by an individual scintillator particle; and
        (b) a cumulative thickness of the organic matrix between the two contacts is at least three times the depth of penetration of radiation emitted by an individual scintillator particle.

2. The detector of claim 1, wherein the scintillator particles have a diameter of 0.01 Ξm to 50 µm.

3. The detector of claim 1, wherein the distance between two scintillator particles is between 30 nm and 3000 nm.

4. The detector of claim 1, wherein the photoactive material comprises a donor/acceptor mixture.

5. The detector of claim 1, wherein the material of the organic matrix is highly resistive in a non-irradiated state of the detector and becomes conductive through irradiation of the detector.

6. The detector of claim 1, wherein the distance between adjacent pairs scintillator particles is less than three times the depth of penetration of the radiation emitted by the scintillator particles.

7. The detector of claim 1, wherein the material of the organic matrix absorbs radiation in a wavelength range in which the scintillator particles emit radiation.

8. The detector of claim 1, wherein a total mass of the scintillator particles is at least 8 times greater than a total mass of the organic matrix.

9. The detector of claim 1, wherein at least one of the first electrical contact and the second electrical contact includes a material that reflects the radiation emitted by the scintillator particles.

10. The detector of claim 1, further comprising:
    a first intermediate layer between the substrate and the first electrical contact; and
    a second intermediate layer between the active layer and the second electrical contact.

11. The detector of claim 1, wherein the distance between two scintillator particles is between 100 and 900 nm.

12. A method for producing a detector for high-energy radiation, the method including:
    providing a substrate with a first electrical contact;
    forming and active layer directly or indirectly over the substrate and including an organic matrix of a photoactive material and non-soluble scintillator particles distributed homogeneously therein;
    forming a second electrical contact directly or indirectly over the active layer;
    wherein the active layer is formed with a mixing ratio between the scintillator particles and the organic matrix such that:
        (a) adjacent pairs of scintillator particles are spaced apart from each other by a maximum distance of five times a depth of penetration of radiation emitted by an individual scintillator particle; and
        (b) a cumulative thickness of the organic matrix between the two contacts is at least three times the depth of penetration of radiation emitted by an individual scintillator particle.

13. The method of claim 12, wherein the scintillator particles have a diameter of 0.01 Ξm to 50 µm.

14. The method of claim 12, wherein a total mass of the scintillator particles is at least 8 times greater than a total mass of the organic matrix.

15. The method of claim 12, wherein forming the active layer comprises:
    producing a suspension that includes scintillator particles, at least one organic semiconductor, and at least one solvent,
    applying the suspension by knife-, spin- or spray-coating.

16. The method of claim 15, wherein the suspension is continuously mixed or stirred during processing.

17. The method of claim 12, wherein forming the active layer comprises applying a powder consisting of scintillator particles encased in at least one organic semiconductor.

18. The method of claim 12, further comprising:
    forming a first intermediate layer between the substrate and the first electrical contact; and
    forming a second intermediate layer between the active layer and the second electrical contact.

19. A detector for high-energy radiation, including:
a substrate with a first electrical contact;
an active layer including an organic matrix made of a photoactive material and non-soluble scintillator particles essentially distributed homogeneously therein, and
a second electrical contact,
wherein the scintillator particles are spaced apart from each other by areas of the organic matrix, and
wherein a mixing ratio between the scintillator particles and the organic matrix in the active layer is selected such that adjacent pairs of scintillator particles are spaced apart from each other by a maximum distance of five times a depth of penetration of radiation emitted by an individual scintillator particle; and
wherein a total mass of the scintillator particles is at least 8 times greater than a total mass of the organic matrix.

20. The detector of claim 19, wherein the total mass of the scintillator particles is between 8 and 75 times greater than a total mass of the organic matrix, inclusive.

21. A method for producing a detector for high-energy radiation, the method including:
providing a substrate with a first electrical contact;
forming and active layer directly or indirectly over the substrate and including an organic matrix of a photoactive material and non-soluble scintillator particles distributed homogeneously therein;
forming a second electrical contact directly or indirectly over the active layer;
wherein the active layer is formed with a mixing ratio between the scintillator particles and the organic matrix such that adjacent pairs of scintillator particles are spaced apart from each other by a maximum distance of five times a depth of penetration of radiation emitted by an individual scintillator particle; and
wherein a total mass of the scintillator particles is at least 8 times greater than a total mass of the organic matrix.

22. The method of claim 21, wherein the total mass of the scintillator particles is between 8 and 75 times greater than a total mass of the organic matrix, inclusive.

23. A detector for high-energy radiation, including:
a substrate;
a first electrical contact;
a first intermediate layer between the substrate and the first electrical contact;
an active layer including an organic matrix made of a photoactive material and non-soluble scintillator particles essentially distributed homogeneously therein;
a second electrical contact; and
a second intermediate layer between the active layer and the second electrical contact;
wherein the scintillator particles are spaced apart from each other by areas of the organic matrix, and
wherein a mixing ratio between the scintillator particles and the organic matrix in the active layer is selected such that adjacent pairs of scintillator particles are spaced apart from each other by a maximum distance of five times a depth of penetration of radiation emitted by an individual scintillator particle.

24. The detector of claim 23, wherein at least one of the first intermediate layer and the second first intermediate layer includes coated scintillator particles.

* * * * *